May 19, 1964  K. J. DAVIS ETAL  3,133,448
MECHANICAL FEEDING MECHANISM FOR MACHINE TOOL
Filed Sept. 6, 1960  2 Sheets-Sheet 1

INVENTORS
KENNETH J. DAVIS
BY ARTHUR B. BASSOFF
ATTORNEYS

May 19, 1964   K. J. DAVIS ETAL   3,133,448
MECHANICAL FEEDING MECHANISM FOR MACHINE TOOL
Filed Sept. 6, 1960   2 Sheets-Sheet 2
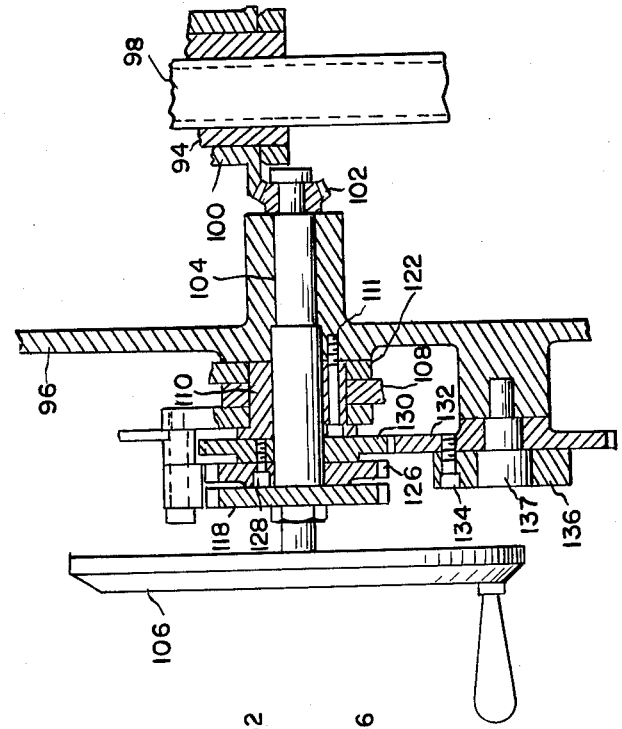
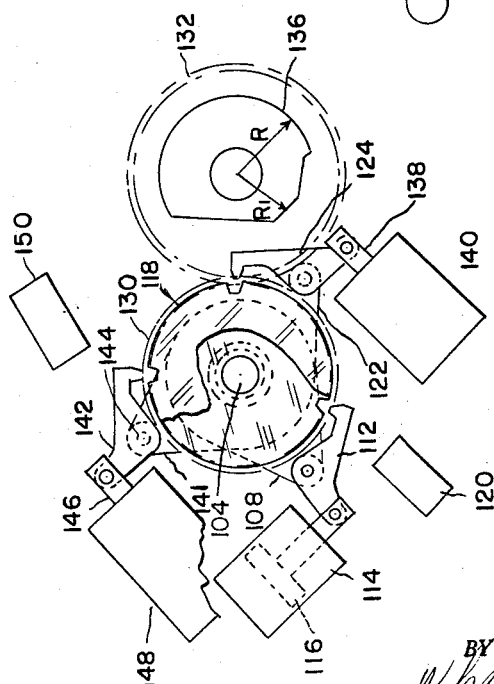
INVENTORS
KENNETH J. DAVIS
BY ARTHUR B. BASSOFF
ATTORNEYS United States Patent Office 3,133,448
Patented May 19, 1964

3,133,448
MECHANICAL FEEDING MECHANISM FOR MACHINE TOOL
Kenneth J. Davis and Arthur B. Bassoff, Detroit, Mich., assignors to National Broach & Machine Company, Detroit, Mich., a corporation of Michigan
Filed Sept. 6, 1960, Ser. No. 54,206
22 Claims. (Cl. 74—142)

This invention relates to a mechanical feeding mechanism for a machine tool. More particularly, this invention relates to a feeding mechanism for causing a downset of a grinding wheel or the like of any machine tool which requires a programmed feed. This invention is particularly useful in forming or crowning helical or spur gears.

The function of this mechanical feeding mechanism is to cause the machine slide to move vertically in small increments according to a predetermined basic pattern and then return the machine slide to its original starting point. Additionally, at suitable intervals the slide may be advanced vertically a predetermined distance without affecting the basic pattern. This cycle is to be performed automatically upon a given signal or signals from other elements of the machine. In addition, the mechanical feeding mechanism is arranged to permit manually controlled movement of the slide without disturbing the automatic cycle construction.

It is an object of the present invention to provide a mechanical feeding mechanism for a metal forming machine which includes means for adjusting the depth of the feed of a grinding wheel or the like of a machine tool for the downset stroke.

Another object of the invention is to provide means for automatically adjusting the depth feed of a grinding wheel or the like of a machine tool in successive increments according to a predetermined basic pattern and to provide an automatic return of the grinding wheel to its initial position.

Still another object of the invention is to provide means for adjusting the depth feed of a grinding wheel or the like of a machine tool in successive increments according to a predetermined basic pattern and to provide means for returning the grinding wheel to its original starting position, both of said means being performed automatically upon a given signal or signals from other elements of the machine tool.

A further object of the invention is to provide a mechanical feed mechanism which includes a serrated wheel, a pair of oscillating support arms freely mounted on the axis of the serrated wheel, a pawl pivoted to each of the support arms, and means connected to each of said pawls, one of said means causing the forward pawl to move directly into the serrations of the wheel and thereafter to effect positive forward rotation of the serrated wheel, and the other of said means causing the return pawl to move directly into the serrations of the wheel and thereafter effect positive reverse rotation of the serrated wheel to its original position.

A still further object of the invention is to provide a mechanical feed mechanism which includes a serrated wheel, a pair of oscillating support arms freely mounted on the axis of the serrated wheel, a pawl pivoted to each of the support arms, and means connected to each of said pawls, one of said means causing the forward pawl to move directly into the serrations of the wheel and thereafter to effect positive forward rotation of the serrated wheel, and the other of said means causing the return pawl to move directly into the serrations of the wheel and thereafter effect positive reverse rotation of the serrated wheel to its original position, each of said pawls being retracted when not in use so as not to interfere with the rotation of the serrated wheel by the opposite pawl.

Another object of the invention is to mount a mechanical feeding mechanism on the movable slide of a machine tool for causing a downset of the slide vertically in small increments according to a predetermined basic pattern and for returning the slide to its initial position after the machine operations have been completed.

Still another object of the invention is to mount a mechanical feeding mechanism on the movable slide of a machine tool, said mechanism operable in a cycle to effect vertical movement of the slide in small increments according to a predetermined basic pattern and to return the slide to its original starting position, said slide being adaptable to be advanced vertically a predetermined distance during the cycle at suitable intervals without affecting the basic pattern.

A further object of the invention is to mount a mechanical feeding mechanism on the movable slide of a machine tool, said mechanism operable in a cycle to effect vertical movement of the slide in small increments according to a predetermined basic pattern and to return the slide to its original starting position, said slide being adaptable to be advanced vertically a predetermined distance during the cycle at suitable intervals without affecting the basic pattern, the entire cycle being performed automatically upon a given signal or signals from other elements of the machine tool.

It is thus another object of this invention to provide a simplified, low-cost structure of the aforementioned types having certain advantages contributing to efficiency, reliability and long life as well as ease of maintenance.

The foregoing, as well as other objects, will become more apparent as this description proceeds, especially when considered in connection with the accompanying drawings illustrating preferred embodiments of the invention, wherein:

FIGURE 3 is a plan view of another embodiment of the mechanical feeding mechanism.

FIGURE 4 is a sectional elevational view showing the embodiment of FIGURE 3 connected to a vertical slide.

Figure 1:
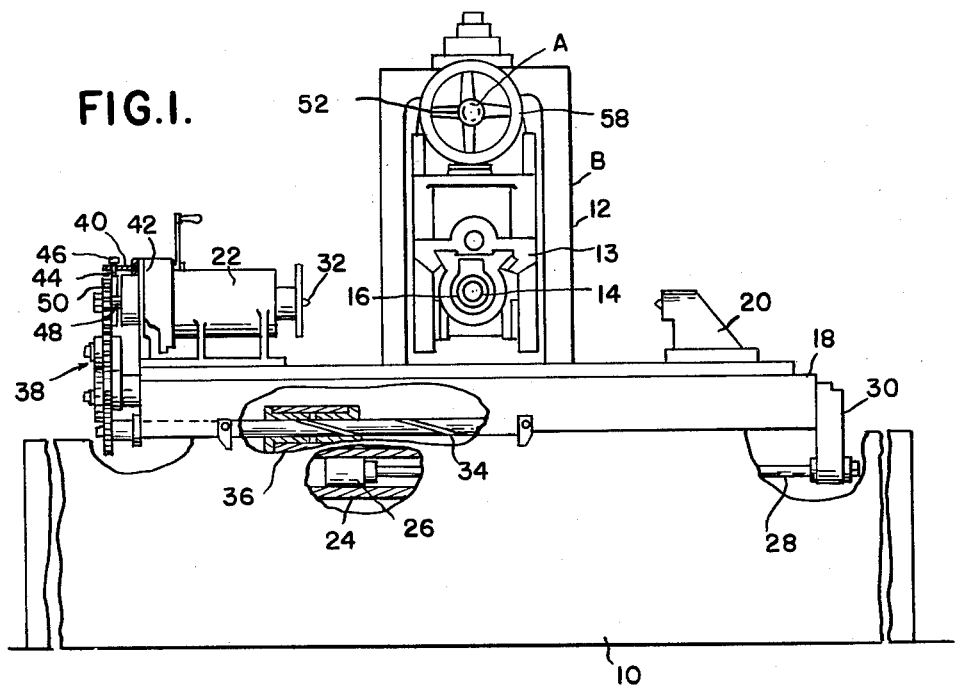
FIGURE 1 is a front elevation of the grinding machine with parts broken away.

Referring now to the figures, the grinding machine comprises a base or frame 10 on which is mounted a tool supporting head 12. The tool supporting head 12 is mounted on arcuate ways, not shown, so as to provide for angular adjustment of the tool support or slide 13. The tool slide 13 carries a spindle 14 to which the grinding wheel 16 is secured and the center of curvature of the arcuate ways coincides with the center of the grinding wheel 16. Suitable means are provided for rotating the grinding wheel 16 in a well known manner.

Mounted on the base 10 is a table 18 having a tailstock 20 and a headstock 22 secured thereto. Means are provided for reciprocating the table 18 and, as illustrated in FIGURE 1, may take the form of a cylinder 24 in which is a piston 26 provided with a connecting rod 28 secured to a depending lug 30 at one end of the table 18.

Means are provided for imparting rotation to the center 32 of the headstock 22 and a means suitable for this purpose is illustrated as a lead bar 34 secured to and reciprocable with the table 18. The lead nut 36 is secured in a stationary relation with respect to the base 10. The lead bar and nut are provided with cooperating helical guiding surfaces so that as the table 18 reciprocates, rotation is imparted to the lead screw 34.

Rotation of the lead screw 34 is transmitted to the center 32 through chain gears indicated generally at 38, these chain gears being provided so that a single lead bar may be effective to produce different relative rotations of the center 32.

A brake means is provided which is effective to take up the backlash between the lead nut and lead screw and to reverse the direction of backlash upon a reversal in the direction of traverse of the table 18. This means comprises a lever 40 pivoted as indicated at 42 to the headstock casting and carrying a section of brake block indicated at 44. Screw means, as indicated at 46, are provided for effecting adjustment between the brake block section 44 and the lever 40. Keyed or otherwise secured to a spindle 48 of the headstock 22 is a brake drum section shown at 50. The brake block 44 bears against the outer periphery of the brake drum 48 with a force which may be adjustable by manipulation of the screw means, which last means are also effective to take up wear as it occurs on the brake block.

The invention relates primarily to the means for effecting a vertical adjustment of the grinding wheel 16 in respect to the work, thus providing a downset of a grinding wheel or the like which requires a programmed feed.

The primary function of the mechanical feeding mechanism is to cause the machine slide 13 to move vertically in small increments according to a predetermined basic pattern and then return the slide 13 to its original starting position. This cycle is to be performed automatically upon a given signal or signals from other elements of the machine. In addition, the mechanical feeding mechanism is arranged to permit manually controlled movement of the slide 13 without disturbing the automatic cycle construction.

This means includes a shaft 52, supported by parts 12 or 13, which moves the slide 13 which carries the spindle 14. A serrated wheel 54 is fixedly connected to the shaft 52 by means of a key and keyway arrangement designated by the numeral 56. A handwheel 58 is provided on the outer end of the shaft for effecting manual vertical adjustment of the slide 13 without disturbing the automatic cycle construction.

The mechanical feeding mechanism further includes a pair of oscillating support arms 60 and 62 which are freely mounted on the shaft 52 of the serrated wheel 54. A downset pawl 64 is pivotally connected to the arm 60 at pivot 66. A cylinder 68 is connected to the frame 12 of the machine tool (assuming that the shaft 52 is mounted to the frame) and has a piston, not shown, movable therein. The piston rod 70 is connected to the outer end of the pawl 64 by a pin 72. The arm 60 has a projection 74 which carries an adjustable stop screw 76 adapted to cooperate with the stationary stop 78 in a manner to be hereinafter described.

The oscillating support arm 62 has a pair of projections 80 and 82. The return pawl 84 is pivotally connected to the projection 80 at pivot 86. A cylinder 88 is connected to the frame 12 of the machine tool and has a piston, not shown, movable therein. The piston rod 90 is connected to the outer end of the return pawl 84 by a pin 92. The projection 82 serves as a stop which is adapted to cooperate with the stationary stop 78 in a manner to be subsequently described.

Figure 2:
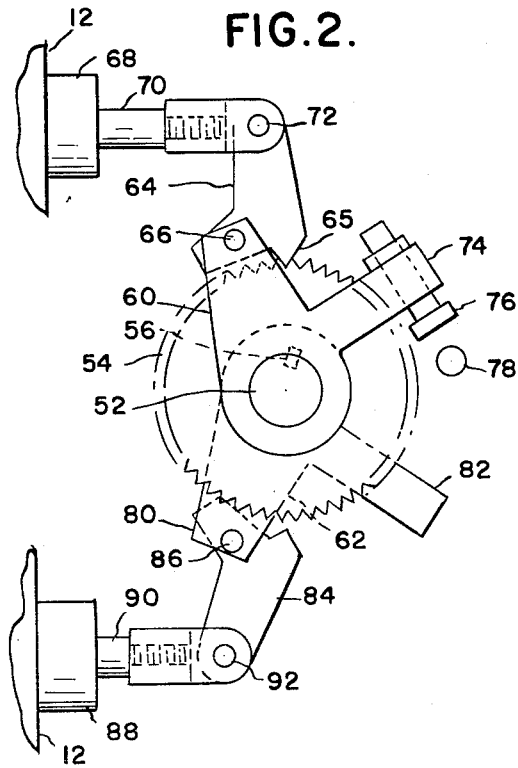
FIGURE 2 is a plan view of a mechanical feeding mechanism which may be utilized with the grinding machine shown in FIGURE 1.

The feeding mechanism is intended for use with a machine tool. Each of the cylinders 68 and 88 is connected to a suitable source of pneumatic or hydraulic power. Cylinder 68 is energized after each stroke to cause a downset of the grinding wheel for the next succeeding stroke. The adjustable stop screw 76 may be adjusted to cooperate with the stationary stop 78 so that the downset of the grinding wheel will be 1, 2 or 3 serrations of the wheel 54. After each downset, the cylinder 68 is energized in an opposite direction, in this case to the left as viewed in FIGURE 2, so as to retract the tooth 65 of the pawl 64 from the serrated wheel 54.

After the predetermined number of downset operations has taken place with the grinding wheel advanced a predetermined number of serrations, and the grinding operation has been completed, it is desirable to return the grinding wheel to its initial position. This is accomplished by energizing cylinder 88 which initially rocks the pawl 84 about pivot 86 into engagement with a tooth of the serrated wheel 54 and thereafter rotates the serrated wheel 54 until the projection 82 of the arm 62 engages the stationary stop 78.

It is apparent that each of the pawls 64 and 84 is retracted when not in use so that it does not interfere with the rotation of the serrated wheel 54 by the opposite pawl.

From the description, it is apparent that a basic mechanical movement is provided with forward and reverse rotation of a serrated wheel being accomplished by two pawls which are pivoted to oscillating support arms which in turn are mounted for rotation about the axis of the serrated wheel. This relationship causes the teeth of the pawls to move directly into serrations and thereafter to effect positive rotation of the serrated wheel. When the corresponding cylinder is retracted, the noses of the pawls are moved directly out of the serrations and produce no forces whatever tending to cause rotation of the serrated wheel.

The second embodiment of the invention is shown in FIGURES 3 and 4 wherein a freely revolving nut 94 is mounted in slide 96. The nut 94 is threaded on stationary screw 98. Beveled gear 100 is keyed and locked to nut 94. Gear 100 is driven by pinion 102 which is keyed to shaft 104. The hand wheel 106 is keyed to the opposite end of shaft 104, thereby enabling an operator to manually rotate nut 94 and cause the slide 96 to move vertically. A first oscillating arm 108 is freely mounted on sleeve 110 which is connected to the slide 96 by means of a bolt 111. Arm 108 carries a pawl 112 which is connected to double-ended cylinder 114 which has a piston 116 movable therein. As the piston 116 is forced outwardly, either pneumatically or hydraulically, pawl 112 engages a tooth of the serrated wheel 118 which is keyed to shaft 104, causing the latter to rotate as the piston 116 continues to advance. The piston stroke is limited by the stop 120. The return movement of the piston 116 withdraws pawl 112 from the serrated wheel 118 and the pawl 112 returns to its starting position without disturbing the position of the serrated wheel 118. Such an arrangement provides an automatic means for vertical adjustment of the slide.

A second oscillating arm 122, freely mounted on sleeve 110 carries pawl 124 which is engageable with a second ratchet or serrated wheel 126 and ratchet wheel 118. Pawl 124 is wide enough to engage both serrated wheels 118 and 126 simultaneously. Ratchet wheel 126 is free to revolve about shaft 104. Connected to ratchet wheel 126 by means of a bolt 128 is a gear 130 which meshes with gear 132 to which is connected by means of a bolt 134 a multiple stop cam 136. The gear 132 and stop cam 136 are connected to the slide 96 by means of a plug member 137. The pawl 124 is connected to piston rod 138 which is movable in a double acting cylinder 140. When cylinder 140 is energized, the pawl 124 engages both ratchet wheels 118 and 126 and moves the nut 94, causing the slide 96 to move vertically. Simultaneously, gear 130 drives gear 132 and with it cam 136 which meets the piston rod 138 stopping further advance of the piston rod 138 and also the vertical movement of the slide 96.

On the return stroke, the pawl 124 is withdrawn from the ratchet wheels 118 and 126 and returned to its original starting position. As illustrated by $R-R_1$ on cam 136, it is possible to obtain any desired increment of feed by limiting the length of the stroke of the piston rod 138. Further, it is possible to obtain any desired sequence by varying the number of cam steps and their location.

Upon completion of a feed cycle, it is necessary to return the slide 96 to the cycle start position. A third oscillating arm 141 has pawl 142 connected thereto by means of a pivot pin 144. The pawl 142 is in turn connected to a piston rod 146 which is movable in a double acting cylinder 148. The cylinder 148 has a stroke which is longer than the sum of increments required by cylinder 140. The length of return stroke is controlled by stop 150.

The use of the second and third oscillating arms and associated parts as just described provide a basic pattern or cycle which may be utilized to downset the slide which carries the finishing or cutting tool.

The piston 140 is energized to advance the serrated wheel 118 a predetermined number of serrations, thereby downsetting the slide 96 accordingly. The piston 140 is energized in the opposite direction so as to move the nose of pawl 124 out of engagement with the serrated wheel 118. The operation is repeated to obtain another downset of the slide, the increment being limited in each instance by one of the stop surfaces on cam 136. The procedure is repeated until the necessary rough and finishing cuts on the workpiece have been obtained. When the entire machining operations have been completed, cylinder 148 is energized to return the serrated wheel 118 and hence, slide 96 to their original position. The stroke of piston rod 146 is greater than the sum of the individual increments imparted by piston rod 138.

The slide 96 may also be advanced vertically at suitable intervals a predetermined distance without affecting the basic pattern just described. This cycle is accomplished automatically upon a given signal or signals from other elements of the machine and is achieved by energizing cylinder 114 and moving the nose of pawl 112 into serrations of wheel 118 and thereafter effect positive rotation of the wheel 118.

This invention has provided a novel mechanical feeding mechanism for a gear grinder, gear shaver, or any machine requiring a programmed feed.

The drawings and the foregoing specification constitute a description of mechanical feeding mechanism for machine tool in such full, clear, concise and exact terms as to enable any person skilled in the art to practice the invention, the scope of which is indicated by the appended claims.

What we claim as our invention is:

1. A feed mechanism comprising a support, a rotatable shaft carried by said support, a toothed element fixedly mounted on said shaft, said toothed element being provided with recesses between adjacent teeth, oscillating feed and return arms mounted for rotation on said shaft, said arms being movable independently of one another, a feed pawl connected to said feed arm and movable thereon into and out of a recess in said toothed element, a return pawl connected to said return arm and movable thereon into and out of a recess in said toothed element, a feed actuating device connected to said feed pawl, a return actuating device connected to said return pawl, stop abutment means on said support, first stop means movable upon energization of said feed actuating device and spaced from said stop abutment means a distance which is a function of one increment, second stop means movable upon energization of said return actuating device and spaced from said stop abutment means a distance which is a function of a plurality of increments which said toothed element is advanced, means for energizing said feed actuating device in one direction to move the nose of said feed pawl into engagement with one of the recesses on said element and to thereafter effect rotation of said toothed element and said feed arm one increment to a position limited by the engagement of said first stop means with said stop abutment means, means for thereafter energizing said feed actuating device in a direction to move the nose of said feed pawl out of engagement with said element and thereafter return said feed pawl and said feed arm to their original position without affecting the position of said toothed element, means for energizing said feed device sequentially until said toothed element has been advanced the said plurality of increments, and means for energizing said return actuating device in a direction to move the nose of said return pawl into engagement with one of the recesses on said toothed element and thereafter rotate said toothed element and said return arm in a return direction to a position limited by the engagement of said second stop means with said stop abutment means so as to return said toothed element to its original position.

2. The feed mechanism defined in claim 1 wherein each of said actuating devices is in the form of a fluid operated motor.

3. The feed mechanism defined in claim 1 wherein said toothed element is in the form of a serrated wheel.

4. The feed mechanism defined in claim 1 wherein manually operable means are provided for rotating said shaft to effect movement of said toothed element without energizing said actuating devices.

5. The feed mechanism defined in claim 1 wherein said toothed element is fixedly connected to said shaft by a key and key-way construction.

6. The feed mechanism defined in claim 1 wherein said feed pawl and said return pawl are pivotally connected to said feed arm and said return arm respectively.

7. The feed mechanism defined in claim 1 wherein said first stop means includes a stop surface provided on said feed arm.

8. The feed mechanism defined in claim 7 wherein said stop surface on said feed arm is adjustable.

9. The feed mechanism defined in claim 1 wherein said second stop means includes a stop surface on said return arm.

10. The feed mechanism defined in claim 1 wherein said first stop means is provided on said feed actuating device.

11. The feed mechanism defined in claim 1 wherein said second stop means is provided on said return actuating device.

12. The feed mechanism defined in claim 1 wherein said stop abutment means includes a pair of stop elements which are spaced apart, one stop element for each of said stop means.

13. The feed mechanism defined in claim 12 wherein a plurality of stop surfaces are provided on the stop element corresponding to said first stop means, and means are provided for sequentially moving one of the stop surfaces into the path of said first stop means upon rotation of said toothed element to vary the incremental feed thereof.

14. A feed mechanism comprising a support, a rotatable shaft carried by said support, a first toothed element fixedly mounted on said shaft, a second toothed element mounted for rotation on said shaft, said elements being provided with recesses between adjacent teeth, oscillating feed and return arms mounted for rotation on said shaft, said arms being movable independently of one another, a feed pawl connected to said feed arm and movable thereon into and out of recesses in said elements, a return pawl connected to said return arm and movable thereon into and out of a recess in said first toothed element, a feed actuating device connected to said feed pawl, a return actuating device connected to said return pawl, feed stop abutment means on said support, return stop abutment means on said support, first stop means movable upon energization of said feed actuating device and spaced from said feed stop abutment means, said feed stop abutment means having a plurality of stop surfaces thereon, means interposed between said second toothed element and said feed stop abutment means for rotating said last mentioned means upon rotation of said second toothed element to position successively one of said stop surfaces in the path of movement of said first stop means, second stop means movable upon energization of said return actuating device and spaced from said return stop abutment means a distance which is a function of the total number of increments which said toothed elements are advanced, means for energizing said feed actuating device in one direction to move the nose of said feed pawl into engagement with the opposite recesses in said toothed elements and to thereafter effect rotation of said elements and said feed arm to a position limited by the engagement of said first stop means with one of the stop surfaces on said feed stop abutment means, means for thereafter energizing said feed actuating device in a direction to move the nose of said feed pawl out of engagement with said elements and thereafter return said feed pawl and said feed arm to their original position without effecting the position of said elements, means for energizing said feed device sequentially until said toothed elements have been advanced the required number of increments, and means for energizing said return actuating device in a direction to move the nose of said return pawl into engagement with the opposite recesses on said toothed elements and thereafter rotate said elements and said return arm in a return direction to a position limited by the engagement of said second stop means with said return stop abutment means so as to return said toothed elements to their original position.

15. The feed mechanism defined in claim 14 wherein the means interposed between said second toothed element and said feed stop abutment means include gear means.

16. The feed mechanism defined in claim 15 wherein said gear means comprises a first gear on said shaft which is connected to said second toothed element, and a second gear in meshed engagement with said first gear and connected to said feed stop abutment means.

17. The feed mechanism defined in claim 15 wherein a second feed arm is mounted for rotation on said shaft and movable independently of said other arms, a second feed pawl connected to said second feed arm, a second feed actuating device mounted on said other member and connected to said feed pawl, and means for energizing said second feed actuating device in one direction to move the nose of said second feed pawl into engagement with the opposite recess in said first toothed element to thereafter effect rotation of said first element and said second feed arm in a feed direction without effecting the position of said second toothed element and said feed stop abutment means.

18. The feed mechanism defined in claim 17 wherein third stop means are provided which is movable upon energization to said second feed actuating device and adapted to engage second feed stop abutment means provided on said other member.

19. The feed mechanism defined in claim 14 wherein each of said actuating devices is in the form of a fluid operated motor.

20. The feed mechanism defined in claim 14 wherein said element is in the form of a serrated wheel.

21. The feed mechanism defined in claim 14 wherein manually operable means are provided for rotating said shaft to effect movement of said toothed element without energizing said actuating devices.

22. The feed mechanism defined in claim 14 wherein said feed pawl and said return pawl are pivotally connected to said feed arm and said return arm respectively.

References Cited in the file of this patent

UNITED STATES PATENTS

| | | |
|---|---|---|
| 192,623 | Hammelmann | July 3, 1877 |
| 405,756 | Baker | June 25, 1889 |
| 540,954 | Darling | June 11, 1895 |
| 1,261,934 | Horne | Apr. 9, 1918 |
| 2,135,204 | Staley et al. | Nov. 1, 1938 |
| 2,138,722 | Beers | Nov. 29, 1938 |
| 2,528,988 | Aeppi | Nov. 7, 1950 |
| 2,543,759 | Cannon | Mar. 6, 1951 |
| 2,871,732 | Olson | Feb. 3, 1959 |
| 2,880,652 | Welte | Apr. 7, 1959 |
| 2,908,175 | Robbins | Oct. 13, 1959 |
| 2,923,179 | Pierce | Feb. 2, 1960 |
| 2,947,317 | Towler et al. | Aug. 2, 1960 |
| 2,968,133 | Reichardt | Jan. 17, 1961 |
| 3,004,525 | Emain | Oct. 17, 1961 |
| 3,031,902 | Parske | May 1, 1962 |